(12) United States Patent
Richard et al.

(10) Patent No.: US 8,348,344 B2
(45) Date of Patent: Jan. 8, 2013

(54) ADJUSTMENT MECHANISM FOR VEHICLE SEAT

(75) Inventors: Denis Richard, Saint Martin de Fontenay (FR); Olivier Kircher, Saint Georges des Groseillers (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 13/281,672

(22) Filed: Oct. 26, 2011

(65) Prior Publication Data

US 2012/0112508 A1 May 10, 2012

(30) Foreign Application Priority Data

Nov. 10, 2010 (FR) ...................................... 10 59297

(51) Int. Cl.
*B60N 2/16* (2006.01)
*F16H 21/40* (2006.01)
(52) U.S. Cl. ...................................... 297/344.12; 74/25
(58) Field of Classification Search ............. 297/344.12, 297/463.1, 344.1; 74/25
See application file for complete search history.

(56) References Cited

U.S. PATENT DOCUMENTS

| | | | | |
|---|---|---|---|---|
| 5,643,128 A * | 7/1997 | Kennedy | ........................ | 475/168 |
| 6,955,251 B2 | 10/2005 | Kurita et al. | | |
| 7,032,731 B2 * | 4/2006 | Kim | ................................. | 192/15 |
| 8,051,967 B2 * | 11/2011 | Hochmuth | ........................ | 192/38 |
| 2003/0001418 A1 * | 1/2003 | Baloche et al. | ........... | 297/344.12 |
| 2009/0184554 A1 * | 7/2009 | Paing et al. | .................... | 297/358 |
| 2009/0273218 A1 | 11/2009 | Park | | |

FOREIGN PATENT DOCUMENTS

| | | |
|---|---|---|
| JP | 2002/266903 A | 9/2002 |
| JP | 2004/338426 A | 12/2004 |

OTHER PUBLICATIONS

Search report from counterpart French Application No. 1059297 Report dated Nov. 10, 2010.

* cited by examiner

*Primary Examiner* — Milton Nelson, Jr.
(74) *Attorney, Agent, or Firm* — Miller, Matthias & Hull LLP

(57) ABSTRACT

An adjustment mechanism for a vehicle seat comprising a support including an annular inner surface, an output member mounted to pivot and including an outer surface, first and second rolling bearing members interposed respectively in first wedge-shaped areas, a driving member having driving fingers designed to push the first and second rolling bearing members, the outer surface including driving portions designed to be pushed by said first and second rolling bearing members respectively in the second and first directions of rotation, the outer surface not having direct contact with the annular inner surface.

9 Claims, 7 Drawing Sheets

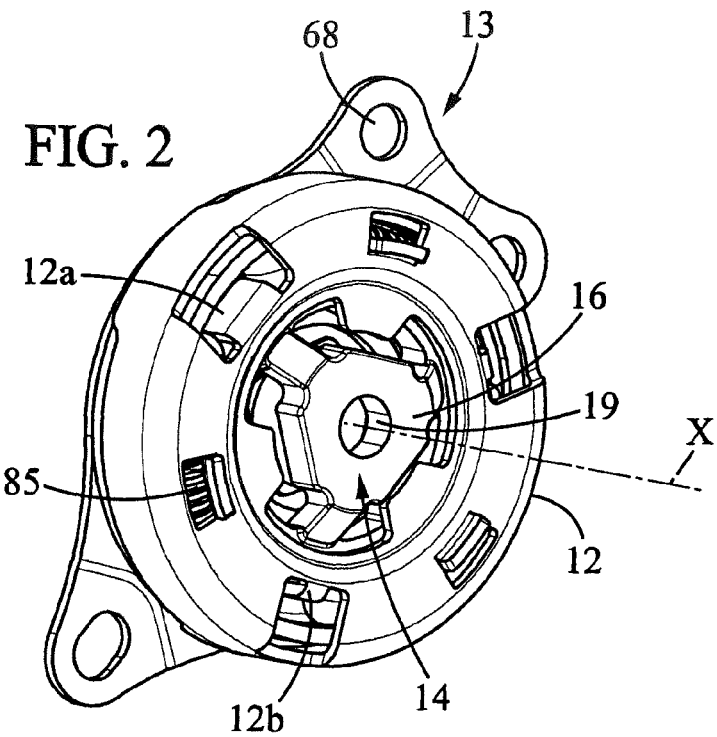
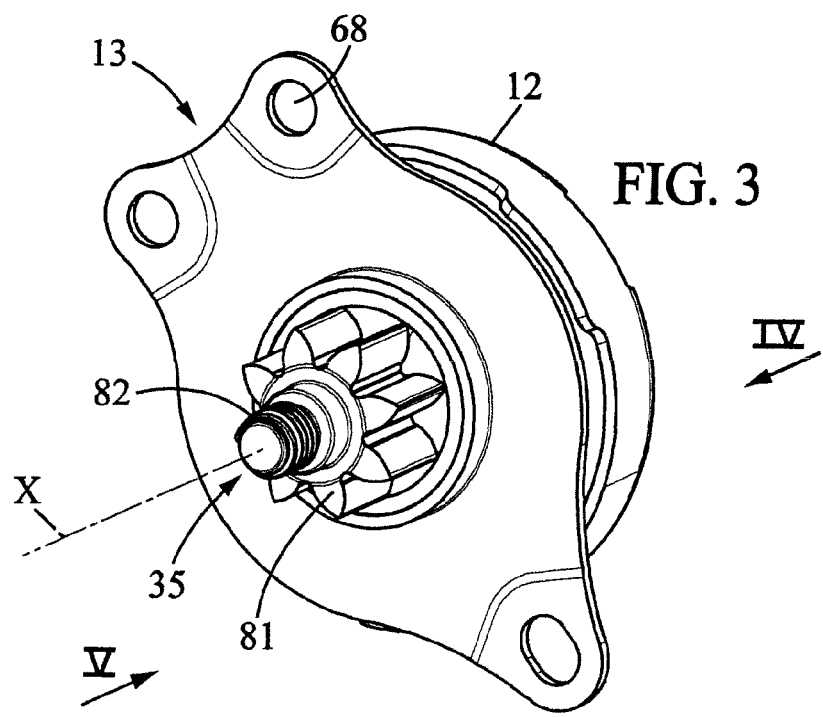

ADJUSTMENT MECHANISM FOR VEHICLE SEAT

CROSS-REFERENCE TO RELATED APPLICATIONS

This application claims priority under the Paris Convention to the French Patent Application No. 10 59297, filed on Nov. 10, 2010.

FIELD OF THE DISCLOSURE

The present invention relates to adjustment mechanisms and to the motor vehicle seats that include such mechanisms.

BACKGROUND OF THE DISCLOSURE

More particularly, the invention relates to an adjustment mechanism for a vehicle seat comprising:
- a support including an annular inner surface, centred on a main axis of rotation,
- a control stage including a driving member mounted to pivot relative to the support about the axis of rotation,
- an output member mounted to pivot substantially about said axis of rotation and including an outer surface,
- at least one first rolling bearing member interposed respectively in a first wedge-shaped area formed between said outer surface and said annular inner surface, so that the first rolling bearing member is designed to guide the output member in rotation about the main axis and to block the rotation of the output member relative to the support in a first direction of rotation,
- at least one second rolling bearing member interposed respectively in a second wedge-shaped area formed between said outer surface and said annular inner surface and oriented opposite the first wedge-shaped area, so that the second rolling bearing member is designed to guide the output member in rotation about the main axis and to block the rotation of the output member relative to the support in a second direction of rotation,
- the driving member comprising driving fingers designed to push the first and second rolling bearing members.

The document US2009/0273218 describes such an adjustment mechanism. In this mechanism, however, the driving of the output member by the driving member is done by pins linked to the driving member which are received in oblong holes formed in the output member.

SUMMARY OF THE DISCLOSURE

The aim of the present invention is to simplify such mechanisms.

To this end, according to a first aspect, the invention proposes a mechanism wherein that the outer surface includes driving portions positioned circumferentially symmetrically to the wedge-shaped areas relative to the first and second rolling bearing members, said driving portions being designed to be pushed by said first and second rolling bearing members respectively in the second and first directions of rotation, the mechanism also being characterized in that the outer surface does not have direct contact with the annular inner surface.

Thus, the driving of the output member by the driving member can be performed via the driving fingers which push the rolling bearing members which in turn push the output member by virtue of the driving portions. Thus, not only the guiding but also the driving of the output member is performed simply by means of the rolling bearing members.

According to another aspect of the invention, the mechanism also includes a radial play separating at least one of the rolling bearing members from the two elements that surround it consisting of the outer surface and the annular inner surface, said play being between 0.01 mm and 0.5 mm, by means of which the output member can be offset by a radial force relative to the main axis of rotation X.

Thus, in the case of a force being exerted on the base of the seat, a radial force is exerted on the output member and causes the output member to be offset which results in a better wedging of the rolling bearing members in the wedge-shaped areas. Moreover, mounting the mechanism is made easier by the play.

In various embodiments of the invention, it is possible, if appropriate, to also use one or other of the following arrangements, taken alone or in combination:
- the driving portions are in the form of a circular arc, with a radius substantially identical to the radius of the first and second rolling bearing members;
- the mechanism comprises at least three, preferably five, first rolling bearing members and at least three, preferably five, second rolling bearing members;
- springs are interposed between the first and second rolling bearing members, so that the first and second rolling bearing members are pushed towards the wedge-shaped areas;
- the springs are situated radially outside the driving portions;
- the driving fingers are interposed between the first and second rolling bearing members in the wedge-shaped areas.

According to yet another aspect, the subject of the invention is a motor vehicle seat including an adjustment mechanism as defined above. In particular, the seat may include a base that can be adjusted in height, the adjustment mechanism controlling the up and down movement.

BRIEF DESCRIPTION OF THE DRAWINGS

Other objects and advantages of the invention will become apparent from the following description, given with reference to the appended drawings in which:

FIG. 2 is a perspective view of the adjustment mechanism of the seat of FIG. 1, seen from the input side, FIG. 3 is a perspective view of the mechanism of FIG. 2, seen from the output side.

DETAILED DESCRIPTION OF THE DISCLOSURE

In the different figures, the same references designate identical or similar elements.

Figure 1:
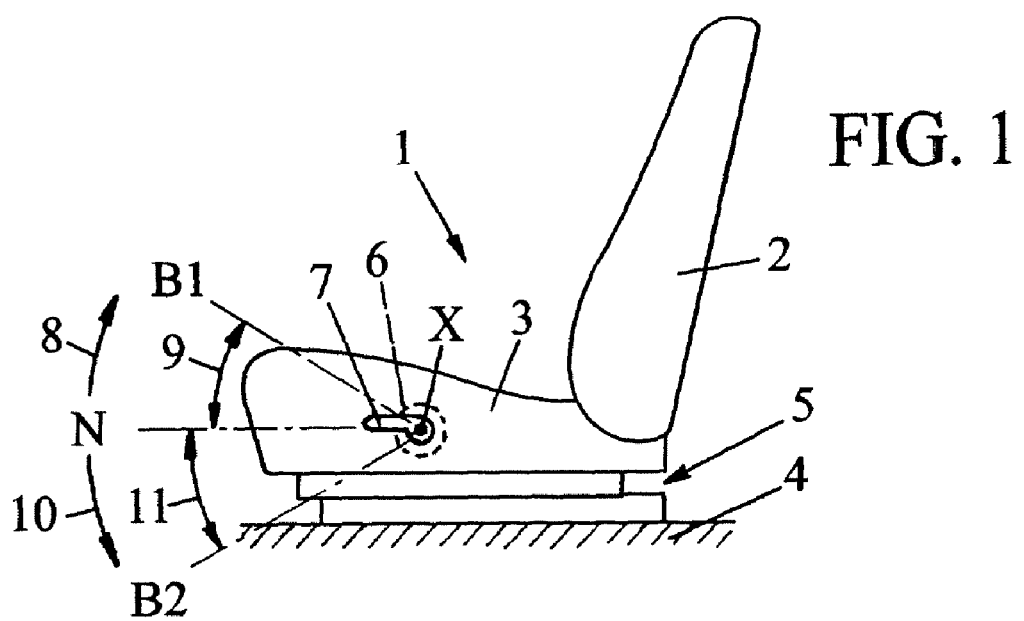
FIG. 1 is a schematic view of a vehicle seat whose base can be adjusted in height by means of an adjustment mechanism according to the invention.

FIG. 1 represents a motor vehicle seat 1 which includes a back rest 2 borne by a base 3 which is in turn mounted on the floor 4 of the vehicle, for example by means of longitudinal slide rails 5.

The base 3 is linked to the slide rails 5 via a raising mechanism which is known per se (not represented) which makes it possible to adjust the height of the base 3. This raising mechanism is controlled by an adjustment mechanism 6, which is itself driven by an actuation means such as a control lever 7 (or a handle of different form) mounted to pivot about a transversal horizontal axis of rotation X.

As represented in the figures, the lever 7 may be a lever acting on a so-called "pumping" control stage which will be detailed herein below. In this configuration, the lever 7 is elastically biased towards a rest position N in which said lever can be positioned, for example, substantially horizontally. From this rest position N, the lever 7 can be displaced:

- in a first direction 8, within a first angular segment 9 delimited between the rest position N and a first stop position B1,
- and in a second direction 10 opposite to the first direction 8, within a second angular segment 11 delimited between the rest position N and a second stop position B2.

In another configuration, not represented in the figures, but well known in the art, the lever 7 may be a lever acting on a direct control stage, that is to say without the "pumping" function described above.

As represented in FIGS. 2 to 5, the adjustment mechanism 6 includes a support-forming housing which is fixed relative to the base of the seat. This support-forming housing includes two metal plate flanges 12, 13 respectively forming a baseplate 13 and a cover 12 which are assembled together, the cover 12 having crimping regions 26. The assembly of the cover 12 on the baseplate 13 can be done by welding, crimping, a combination of the two or another assembly technique.

Figure 4:
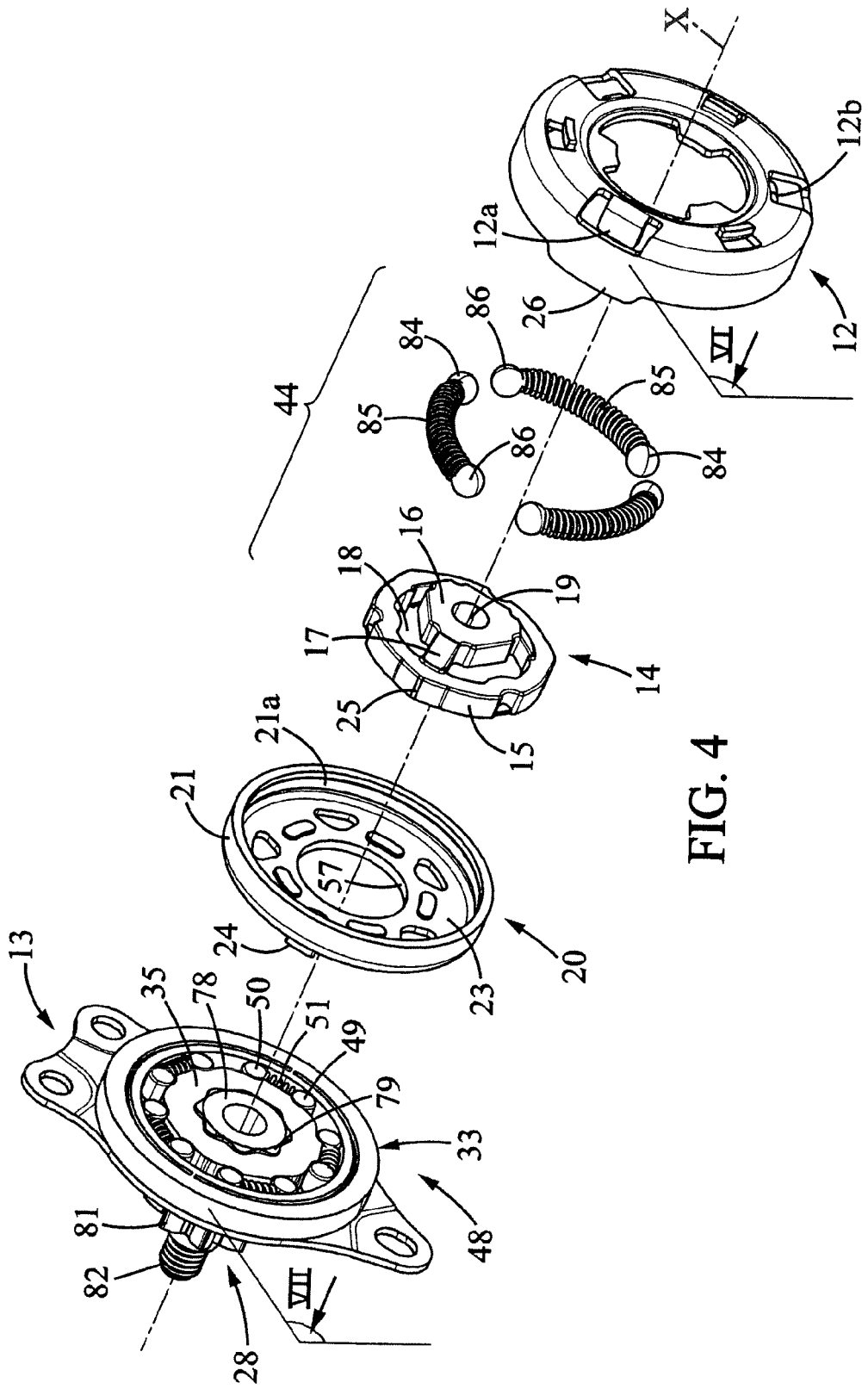
FIG. 4 is an exploded perspective view of the adjustment mechanism of FIG. 2.
Figure 5:
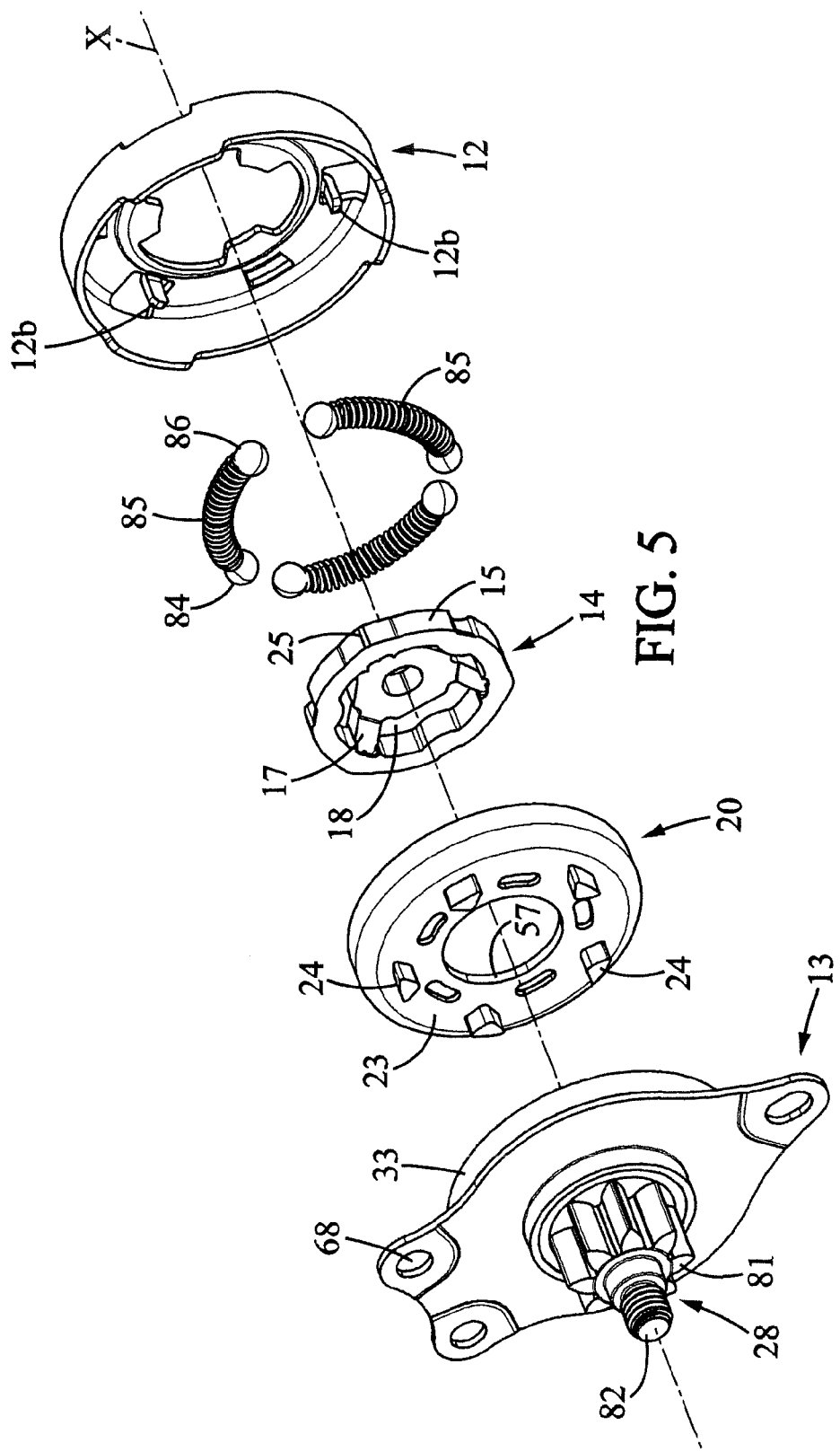
FIG. 5 is another exploded perspective view of the adjustment mechanism of FIG. 2.

Referring to FIGS. 2, 4 and 5, the adjustment mechanism 6 includes an input member 14 which comprises a peripheral ring 15 with three radial bosses 25 and which is linked to a central part 16 of generally triangular form, centred on the axis X, via three bridges 17 angularly separated from one another by three voids 18. The central part 16 of the input member 14 is pierced with a tapped hole 19 which makes it possible to fasten the abovementioned lever 7. The lever 7 also has a form complementing the central part 16 of the input member 14, which enables the two parts to be engaged together and which enables the input member 14 to be driven in rotation by the lever 7 in each of the abovementioned directions 8, 10.

More specifically, the adjustment mechanism 6 comprises:
- a control stage 44 housed in the cover 12, which is, in the example illustrated, a so-called "pumping" control stage which will be detailed later,
- a driving member 20, driven by the abovementioned control stage 44,
- a thick metal ring 33 of annular form centred on the axis X and including an annular inner surface 34 of cylindrical revolution about the axis X, said thick metal ring 33 being solidly fastened to the baseplate 13 by welding or other means, or else produced and obtained integrally with the baseplate 13,
- five pairs of rolling bearing members 49, 50, between which springs 51 may be situated,
- an output assembly 28 which comprises an output member 35 and an output drive pinion 81.

The output member 35, the thick metal ring 33 and the five pairs of rolling bearing members 49, 50 thus define a guiding and locking stage 48 for the output member 35 whose operation will be detailed later.

The housing is fastened, for example, to the frame of the seat 3 by means of screw-fastening orifices 68, riveting or other means.

Moreover, the driving member 20, also called "driver" is mounted to pivot about the axis of rotation X. The driving member 20 comprises a body in the form of a ring 21 centred on the axis of rotation X (FIGS. 3 and 4). This ring 21 has a cylindrical bearing surface 21a, directed inwardly and of revolution about the axis X, and said ring 21 is positioned around the ring 15 of the input member.

The cylindrical bearing surface 21a radially delimits, with the input member 14, a hollow intermediate space 22 (see FIGS. 4 and 6) which forms, on either side of each boss 25 of the input member, first and second wedge-shaped areas 22a, 22b diverging respectively in the first and second directions 8, 10. In each of these first and second wedge-shaped areas 22a, 22b there are, respectively, a first ball 84, a second ball 86 (these balls, preferably made of steel, may also be steel rollers) and a spring 85 between the two said balls, the spring 85 tending to separate the balls from one another and therefore to push them into the wedge-shaped areas 22a, 22b.

The driving member 20, preferably made of metal, includes a bottom 23 formed of a single piece with the ring 21 opposite the cover 12, this bottom 23 also including five axial driving fingers 24 extending towards the baseplate 13 of the housing parallel to the axis X and an axial bore 57 centred on the axis X. Each axial driving finger 24 has a section of generally triangular form, so that, when this finger bears on one of the rolling bearing members 49, 50, its bearing point is diametrically opposite the area where said rolling bearing member contacts a portion of the output member 35 associated with this rolling bearing member.

Figure 6:
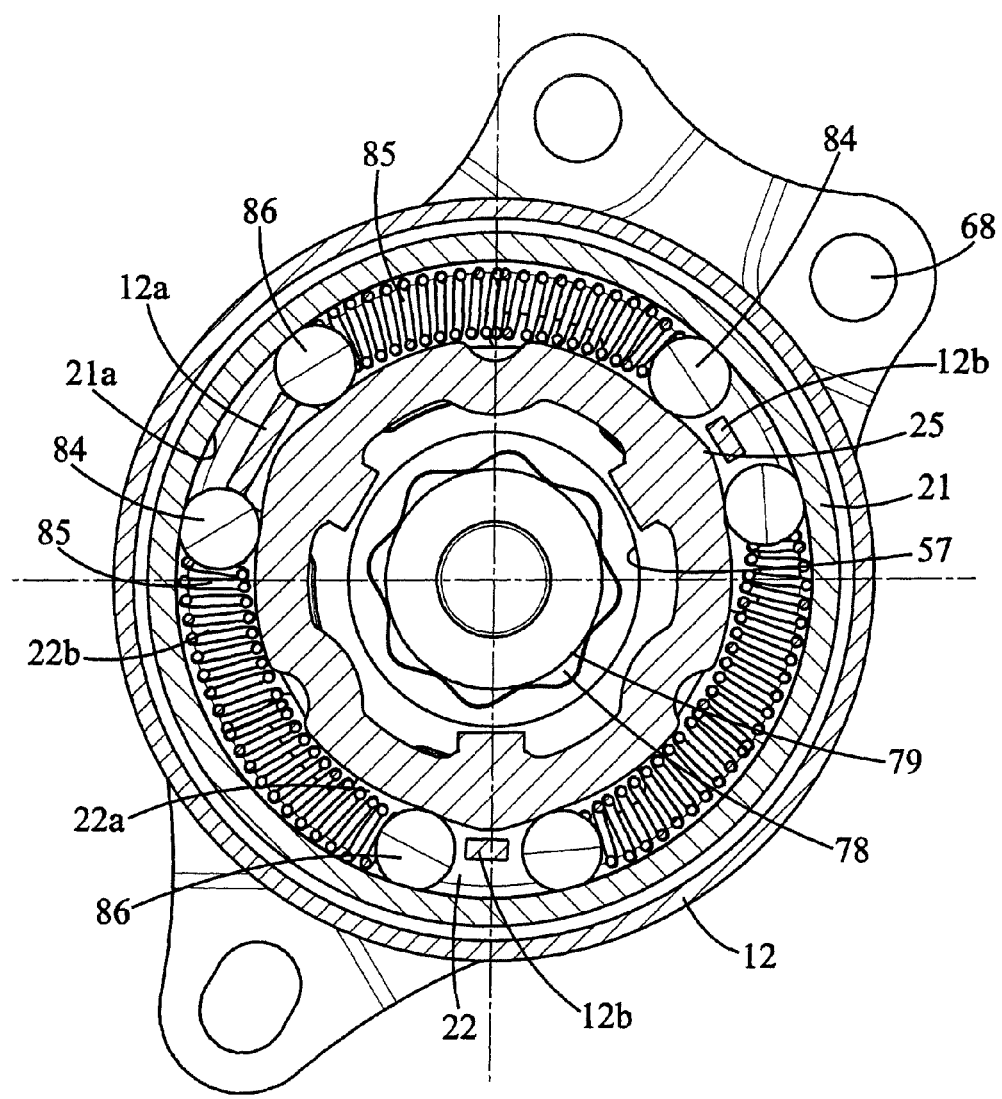
FIG. 6 is a view in transversal cross section of the mechanism of FIG. 2, along the lines VI-VI of FIG. 4.

In the intermediate annular space 22 there are three fixed axial fingers 12a, 12b which may consist, notably, of tabs cut from the cover 12 of the housing and folded axially towards the interior of said housing. One axial finger 12a is wider than the other two 12b. In the rest position of the "pumping" control stage of the adjustment mechanism 6, the bosses 25 of the input member 14 are respectively positioned facing the three fixed axial fingers 12a, 12b (FIG. 6).

Moreover, the thick metal ring 33 of the adjustment mechanism 6, as represented in FIGS. 3, 4 and 5, is attached to the baseplate 13 of the housing, and is interposed axially between the baseplate 13 of the housing and the driving member 20. By way of nonlimiting example, said fixed ring 33 can be attached to the baseplate 13 by laser welding or any other known means.

As represented in FIGS. 3 and 5, the output assembly 28, preferably made of metal, comprises the output member 35, already mentioned, having an inner spline, a drive pinion 81 engaged in the element of the raising mechanism situated downstream of the adjustment mechanism 6 and not represented in the figures, said drive pinion 81 being rigidly linked to a sleeve 78 situated axially opposite the drive pinion 81, said sleeve having an external spline received without play by complementarity in the internal spline of the output member 35 and a collar 79. Furthermore, the output assembly includes an end threading 82. The drive pinion 81, the sleeve 78 and the output member 35 may be made of a single piece or be securely assembled together by any known means.

Figure 7:
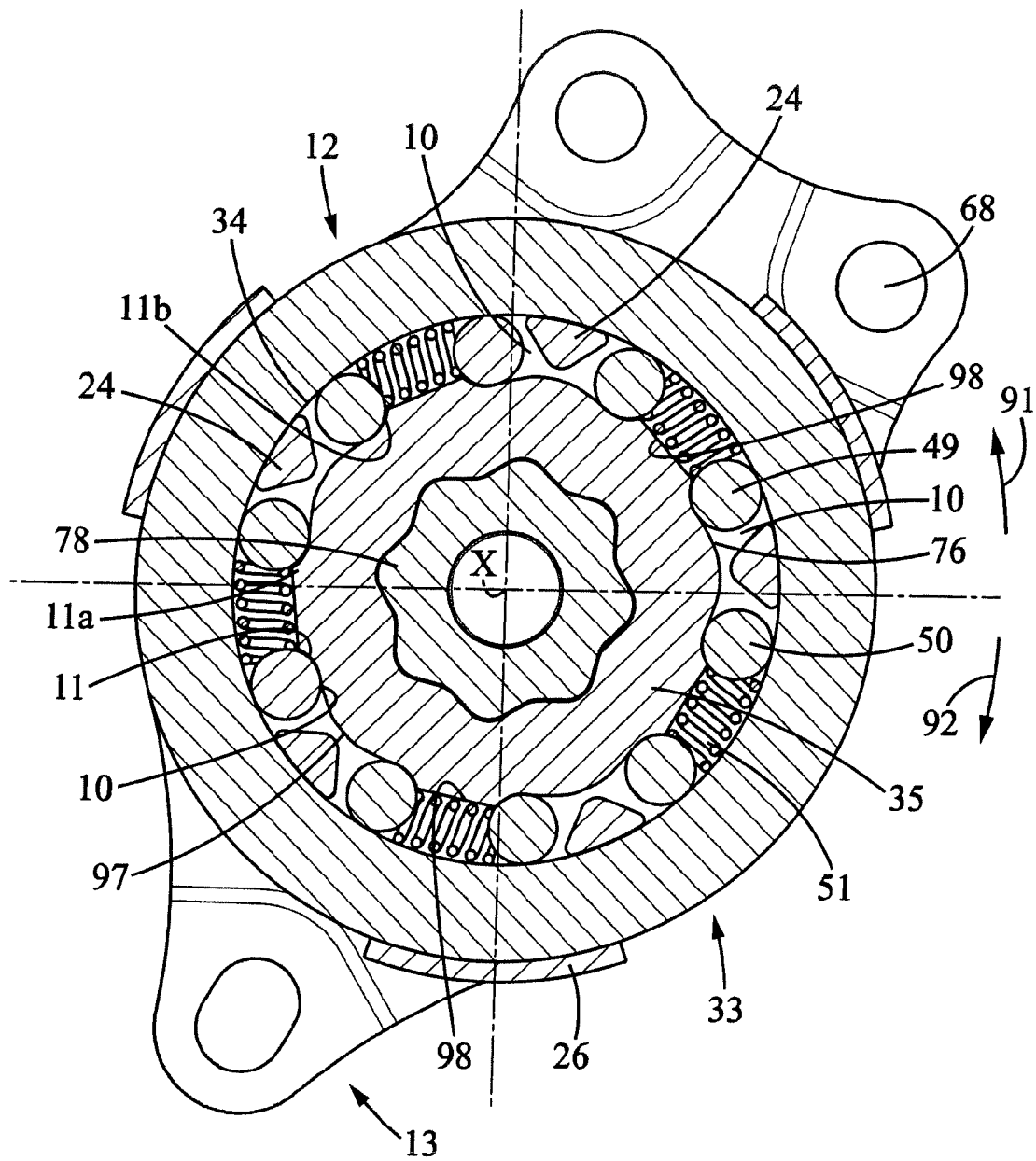
FIG. 7 is another view in transversal cross section of the mechanism of FIG. 2, along the lines VII-VII of FIG. 4, FIGS. 8 and 9 are detail views of FIG. 7.
Figure 8:
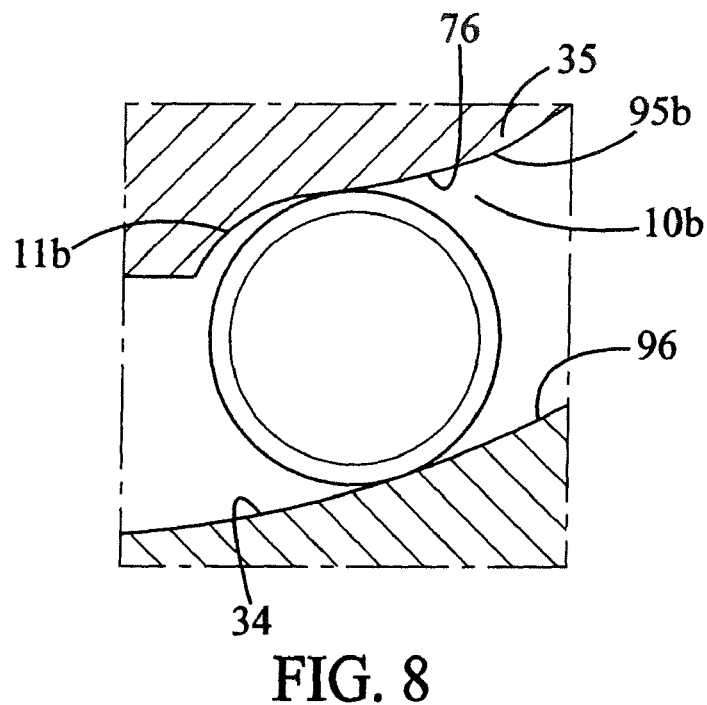
Figure 9:
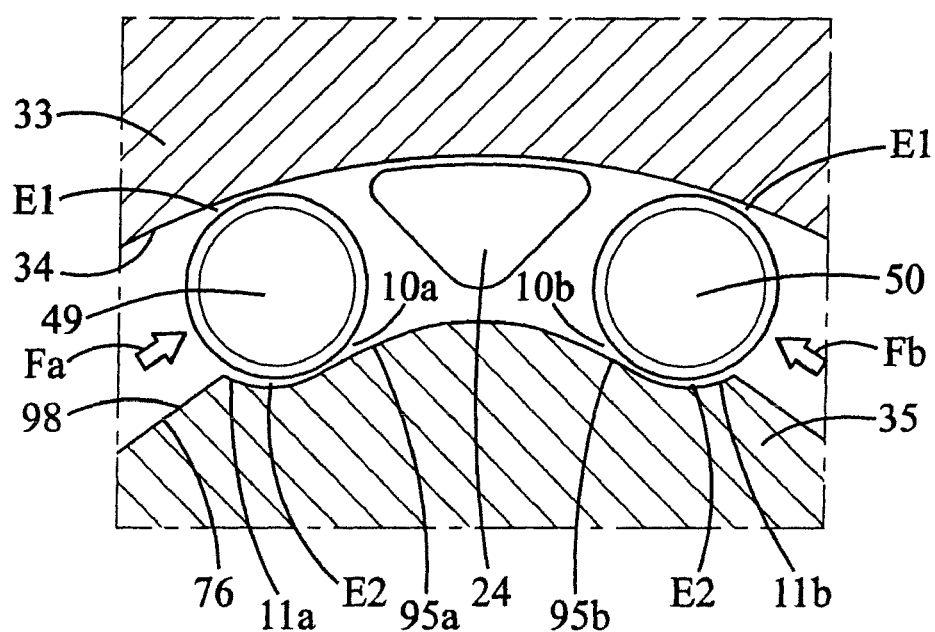

The guiding and locking stage 48, which can be seen in particular in FIG. 7 and also FIGS. 8 and 9, comprises:

the annular inner surface 34, already mentioned, belonging to the thick ring 33, the output member 35 with its outer surface 76 which will be described later, the output member 35 being rigid in rotation to the output drive pinion 81, five first rolling bearing members 49 interposed in first wedge-shaped areas 10, 10*a* formed between the outer surface 76 and the annular inner surface 34, five second rolling bearing members 50 interposed respectively in second wedge-shaped areas 10, 10*b* formed between the outer surface 76 and the annular inner surface 34, the driving fingers 24, already mentioned, interposed respectively between the first and second rolling bearing members 49, 50.

The outer surface 76 includes, in the example illustrated, a succession of five identical patterns comprising, in the clockwise direction:

a flat 98, the normal of which coincides with the radial direction, a driving portion 11, 11*a* designed to come into surface contact with a first rolling bearing member 49, said driving portion preferably being in the form of a portion of a circular arc, advantageously, furthermore, with a radius identical to the radius of the first rolling bearing members 49, a first ramp 95*a* defining, with the portion 96 of the annular inner surface 34 which is located opposite a first wedge-shaped area 10*a*, a convex summit 97, in front of which there is one of the driving fingers 24, a second ramp 95*b* defining, with the portion 96 of the annular inner surface 34 which is located opposite a second wedge-shaped area 10*b*, another driving portion 11, 11*b* designed to come into surface contact with a second rolling bearing member 50, preferably having the form of a portion of a circular arc, advantageously, furthermore, with a radius identical to the radius of the second rolling bearing members 50.

By virtue of this arrangement, the first and second rolling bearing members 49, 50 are designed to guide the output member 35 in rotation about the main axis X without direct contact between the outer surface 76 and the annular inner surface 34 when the driving fingers 24 push the rolling bearing members 49, 50 in the anticlockwise direction 91 or in the opposite direction 92.

Moreover, the rest of the time, when the driving fingers 24 do not exert force on the rolling bearing members 49, 50, the latter block the rotation of the output member 35 relative to the support in both directions of rotation, because, as is illustrated in FIG. 8, as soon as a rotational force is exerted from the output side on the output member 35, for example in the direction 92, the rolling bearing member 50 moves up, by rolling over the ramp, into the wedge-shaped area 10*b* and blocks any additional rotation in that direction.

If a force is exerted in the anticlockwise direction 91, similarly, the first rolling bearing member 49 moves up, by rolling over the ramp, into the wedge-shaped area 10*a* and blocks any additional rotation in that direction.

The mechanism 6 which has just been described operates as follows, notably by virtue of:

the control stage 44 (FIG. 6) which links the input member 14 to the driving member 20, the locking stage 48 (FIGS. 7 to 9)

the driving member 20 interposed between the abovementioned stages.

As represented in FIG. 6, the control stage 44 includes three pairs of first and second rigid balls 84, 86, respectively positioned in the intermediate annular space 22, in each of the first and second wedge-shaped areas 22*a*, 22*b* which are situated on either side of each boss 25 of the input member 14.

Between each first ball 84 and the second ball 86 corresponding to the adjacent boss 25 of the input member 14, there is an interposed compression spring 85 which is also housed in the intermediate annular space 22, so as to stress the balls towards the wedge-shaped areas 22*a*, 22*b*.

Thus, when the control lever 7 is displaced in one or other of the angular directions 8, 10 away from its rest position N, the bosses 25 of the input member 14 strongly block the first balls 84 against the bearing surface 21*a* in case of actuation in the first angular direction 8 and they block the second balls 86 against the bearing surface 21*a* in case of actuation in the second angular direction 10. The input member 14 then drives the driving member 20 after a very small dead angular travel of the lever 7, this dead travel being able to be, for example, of the order of 1 to 2 degrees. During this movement, one ball in every two remains abutted against the fixed fingers 12*a*, 12*b*.

When the user releases the lever 7 after each actuation, said lever is returned to the rest position N via the springs 85 of the driving stage. During this return movement towards the rest position, the balls 84, 86 which have been displaced by the input member 14 return to their initial position with said input cam, while rubbing against the bearing surface 21*a* of the ring 21. However, this rubbing is not accompanied by any movement of the driving member 20, by virtue of the braking torque obtained by means of the friction contact of the bore 57 on the collar 79 and of the friction contact of the bottom 23 on the output member which is itself blocked in rotation as already explained.

It will be noted that the control stage 44 described above could, if appropriate, be replaced by a ratchet driving mechanism, or any other mechanism operating by reciprocating movements of the lever 7, or even by a direct control mechanism in which the lever is directly secured in rotation to the driving member (in which case, the lever 7 no longer has a neutral position N).

Moreover, as represented in FIG. 7, the locking stage 48 includes the abovementioned five first and second rolling bearing members 49, 50 (for example steel balls or rollers) which are arranged respectively in the first and second wedge-shaped spaces 10*a*, 10*b*.

When the driving member 20 is driven by the control stage 44, the driving fingers 24 are displaced by rotation, for example in the anticlockwise direction 91 (see FIG. 7). Under the effect of this rotation, all the driving fingers 24 simultaneously push the first rolling bearing members 49; this causes the first rolling bearing members 49 to exert a force on the driving portions 11*a* on which they bear. A rotation of the output member 35 in the anticlockwise direction 91 follows.

As for the second rolling bearing members 50, they are pushed in the same direction by the driving portions 11*b* on which they bear. According to an advantageous aspect of the invention, the second rolling bearing members 50 can also be pushed in the same direction by the presence of the springs 51 which have a tendency to separate the first and second rolling bearing members relative to the flat 98 of the surface 76 of the output member.

This way, the output member 35 rotates at the same time as the driving member 20.

On the other hand, when the driving fingers 24 cease their force, such as, for example, when the user is no longer operating the lever 7, the locking stage 48 blocks the output member 35 in position, because any potential movement causes the first or second rolling bearing members 49 or 50 to move up on the ramps and therefore be wedged as explained previously.

The operation of the device is similar, mutatis mutandis, when the driving member 20 rotates in the clockwise direction 92 and the driving fingers 24 push the second rolling bearing members 50.

According to one of the aspects of the invention, a play E1, E2 may be provided in the mounting of the elements of the locking stage 48, as is illustrated in FIG. 9. This arrangement allows the axis of the output member, when the latter is subjected to a radial force, to be displaced, parallel or not, relative to the main axis of the mechanism, more specifically the reference axis of the output member 35 may be offset while remaining parallel to the main axis X or be offset angularly by a few degrees relative to the main axis X.

In the case where springs are used, even in the case of the output member 35 being offset, the forces Fa, Fb exerted by the springs 51 on the rolling bearing members 49, 50 push each of them respectively into the wedge-shaped areas 10a, 10b to ensure the self-wedging of the locking stage 48.

It should be noted that the number of first, respectively second, rolling bearing members could be equal to one, to two or could be equal to three, or even four.

It should also be noted that the springs 51 are not strictly necessary to the effective operation of the device.

The invention claimed is:

1. An adjustment mechanism for a vehicle seat comprising:
   a support including an annular inner surface, centered on a main axis of rotation,
   a control stage including a driving member mounted to pivot relative to the support about the main axis of rotation,
   an output member mounted to pivot substantially about said main axis of rotation and including an outer surface,
   at least one first rolling bearing member interposed respectively in a first wedge-shaped area formed between the outer surface and the annular inner surface, so that the first rolling bearing member is designed to guide the output member in rotation about the main axis of rotation and to block the rotation of the output member relative to the support in a first direction of rotation,
   at least one second rolling bearing member interposed respectively in a second wedge-shaped area formed between the outer surface and the annular inner surface and oriented opposite the first wedge-shaped area, so that the second rolling bearing member is designed to guide the output member in rotation about the main axis of rotation and to block the rotation of the output member relative to the support in a second direction of rotation,
   the driving member comprising driving fingers designed to push the first and second rolling bearing members,
   wherein the outer surface includes driving portions positioned circumferentially symmetrically to the wedge-shaped areas relative to the first and second rolling bearing members, said driving portions being designed to be pushed by said first and second rolling bearing members respectively in the second and first directions of rotation,
   and wherein the outer surface does not have direct contact with the annular inner surface.

2. The mechanism according to claim 1, also including a radial play separating at least one of the rolling bearing members from two elements that surround it consisting of the outer surface and the annular inner surface, said play being comprised between 0.01 mm and 0.5 mm, by means of which the output member can be offset by a radial force relative to the main axis of rotation.

3. The mechanism according to claim 1, in which the driving portions are in the form of a circular arc, with a radius substantially identical to the radius of the first and second rolling bearing members.

4. The mechanism according to claim 1, comprising at least three, first rolling bearing members and at least three, second rolling bearing members.

5. The mechanism according to claim 1, in which springs are interposed between the first and second rolling bearing members, so that the first and second rolling bearing members are pushed towards the wedge-shaped areas.

6. The mechanism according to claim 1, in which springs are situated radially outside the driving portions.

7. The mechanism according to claim 1, in which the driving fingers are interposed between the first and second rolling bearing members in the wedge-shaped areas.

8. A motor vehicle seat, including an adjustment mechanism according to claim 1.

9. The seat according to claim 8, including a base that can be adjusted in height by a raising mechanism, the adjustment mechanism controlling the raising mechanism.

\* \* \* \* \*